(12) United States Patent
Sakurada

(10) Patent No.: US 11,305,785 B2
(45) Date of Patent: Apr. 19, 2022

(54) DRIVING ASSISTANCE APPARATUS, DRIVING ASSISTANCE SYSTEM, DRIVING ASSISTANCE METHOD, AND PROGRAM

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 16/582,142

(22) Filed: Sep. 25, 2019

(65) Prior Publication Data

US 2020/0164896 A1  May 28, 2020

(30) Foreign Application Priority Data

Nov. 26, 2018 (JP) .............................. JP2018-220657

(51) Int. Cl.
| | |
|---|---|
| *B60W 50/12* | (2012.01) |
| *B60W 50/14* | (2020.01) |
| *B60W 10/18* | (2012.01) |
| *G07C 5/00* | (2006.01) |

(52) U.S. Cl.
CPC ............ *B60W 50/12* (2013.01); *B60W 10/18* (2013.01); *B60W 50/14* (2013.01); *G07C 5/008* (2013.01); *B60W 2050/143* (2013.01); *B60W 2520/06* (2013.01); *B60W 2540/10* (2013.01); *B60W 2556/45* (2020.02)

(58) Field of Classification Search
CPC ...... B60W 50/12; B60W 50/14; B60W 10/18; B60W 2556/45; B60W 2520/06; B60W 2540/10; B60W 2050/143; G07C 5/008
See application file for complete search history.

(56) References Cited

U.S. PATENT DOCUMENTS 6,937,165 B2 * 8/2005 Rogers .................... G08G 1/167
  340/961
10,783,725 B1 * 9/2020 Gaudin ................. B60W 50/14
(Continued)

FOREIGN PATENT DOCUMENTS

DE   102005052032 A1 *  5/2007   ............ B60W 10/06
JP   2004-280489 A     10/2004
(Continued)

*Primary Examiner* — Peter D Nolan
*Assistant Examiner* — Tanya C Sienko
(74) *Attorney, Agent, or Firm* — Oblon, McClelland, Maier & Neustadt, L.L.P.

(57) ABSTRACT

A driving assistance apparatus according to an embodiment includes a determination unit configured to determine whether or not there is a probability that a vehicle is deviated from a traveling possible range based on map information, position information of the vehicle, and information regarding an advancing direction of the vehicle, and a control information output unit configured to output first control information regarding at least one of warning a driver of the vehicle, restricting drive force of the vehicle regardless of an operation of the driver, and applying braking force to the vehicle regardless of an operation of the driver, in a case where the determination unit determines that there is a probability that the vehicle is deviated from the traveling possible range.

7 Claims, 6 Drawing Sheets

(56) References Cited

U.S. PATENT DOCUMENTS

| | | | | |
|---|---|---|---|---|
| 2012/0166047 A1* | 6/2012 | Khanafer | ........... | B60H 1/00742 701/48 |
| 2014/0195120 A1* | 7/2014 | McClain | ................. | G08G 1/16 701/41 |
| 2019/0019412 A1* | 1/2019 | Roca | ..................... | B60W 30/08 |
| 2019/0329791 A1* | 10/2019 | Oba | ..................... | B60W 50/12 |

FOREIGN PATENT DOCUMENTS

| | | |
|---|---|---|
| JP | 2005-138623 A | 6/2005 |
| JP | 2007-026289 A | 2/2007 |
| JP | 2016-162150 A | 9/2016 |

\* cited by examiner

DRIVING ASSISTANCE APPARATUS, DRIVING ASSISTANCE SYSTEM, DRIVING ASSISTANCE METHOD, AND PROGRAM

INCORPORATION BY REFERENCE

The disclosure of Japanese Patent Application No. 2018-220657 filed on Nov. 26, 2018 including the specification, drawings and abstract is incorporated herein by reference in its entirety.

BACKGROUND

1. Technical Field

The present disclosure relates to a driving assistance apparatus and the like.

2. Description of Related Art

For example, there is a technique in which, for example, in a case where a vehicle may collide with an obstacle, a drive force of the vehicle is restricted, a braking force is automatically generated in the vehicle, or a warning is issued to a driver of the vehicle (for example, refer to Japanese Unexamined Patent Application Publication No. 2005-138623 (JP 2005-138623 A) and Japanese Unexamined Patent Application Publication No. 2004-280489 (JP 2004-280489 A)).

SUMMARY

However, since the driving assistance technique is based on detection of an obstacle present in an advancing direction of a vehicle, depending on a form of accident, the accident may not be appropriately coped with. For example, in a case of an accident in a form in which a vehicle falls outside a self-traveling multistory parking lot or falls to the side of a road, the vehicle may advance to a gap part without a fence or a guardrail depending on an installation aspect of a fence or a guardrail. Thus, at the time of falling, the fence or the guardrail may not be detected as an obstacle. For example, in a case of an accident in a form in which a vehicle runs on a sidewalk provided at the end of a roadway, it is difficult to detect a step difference between the roadway and the sidewalk as an obstacle.

Therefore, in light of the problems, the present disclosure is directed to providing a driving assistance apparatus and the like capable of more appropriately suppressing the occurrence of an accident of a vehicle in a form not based on collision with an obstacle.

A first aspect of the present disclosure relates to a driving assistance apparatus including a determination unit and a controller. The determination unit determines whether or not there is a probability that a vehicle is deviated from a traveling possible range based on map information, position information of the vehicle, and information regarding an advancing direction of the vehicle. The controller outputs first control information regarding at least one of warning a driver of the vehicle, restricting drive force of the vehicle regardless of an operation of the driver, and applying braking force to the vehicle regardless of an operation of the driver, in a case where the determination unit determines that there is a probability that the vehicle is deviated from the traveling possible range.

According to the first aspect, in a case where the vehicle appears to be deviated from the traveling possible range such as a lane region of a road or a self-traveling region and a parking section region of a parking lot, the driving assistance apparatus can prompt an operation for avoiding deviation of the vehicle to be performed by warning a driver of the vehicle. In a case where the vehicle appears to be deviated from the traveling possible range such as a lane region of a road or a self-traveling region and a parking section region of a parking lot, the driving assistance apparatus can restrict drive force of the vehicle or apply braking force to the vehicle such that the vehicle is not deviated from the traveling possible range. Therefore, the driving assistance apparatus can more appropriately suppress the occurrence of an accident of the vehicle in a form not based on collision with an obstacle.

In the driving assistance apparatus according to the first aspect, the traveling possible range may include a roadway region of a road, the determination unit may determine whether or not there is a probability that the vehicle is deviated from the roadway region to a sidewalk region or a roadside zone region, and, in a case where the determination unit determines that there is a probability that the vehicle is deviated from the roadway region of the road to the sidewalk region or the roadside zone region, the controller may output the first control information.

According to the first aspect, for example, in a case where the vehicle appears to run onto a sidewalk region from a roadway region of a road or appears to advance to a roadside zone region and fall out of a road, the driving assistance apparatus can prompt an operation for avoiding deviation of the vehicle to be performed by warning a driver of the vehicle. For example, in a case where the vehicle appears to run onto a sidewalk region from a roadway region of a road or appears to advance to a roadside zone region and fall out of a road, the driving assistance apparatus can restrict drive force of the vehicle or apply braking force to the vehicle such that the vehicle is not deviated from the road to the roadside zone region or the sidewalk region. Therefore, for example, the driving assistance apparatus can suppress an accident in a form in which the vehicle runs onto a sidewalk region from a roadway region of a road or an accident in a form in which the vehicle advances to a roadside zone region from a roadway region and falls out of a road.

In the driving assistance apparatus according to the first aspect, the traveling possible range may include a self-traveling region and a parking section region of a self-traveling parking lot, the determination unit may determine whether or not there is a probability that the vehicle is deviated from the self-traveling region or the parking section region of the parking lot to regions other than the self-traveling region and the parking section region, and, in a case where the determination unit determines that there is a probability that the vehicle is deviated from the self-traveling region or the parking section region to regions other than the self-traveling region and the parking section region, the controller may output the first control information.

According to the first aspect, for example, in a case where the vehicle appears to run out of a self-traveling region or a parking section region of a parking lot to other regions, the driving assistance apparatus can prompt an operation for avoiding deviation of the vehicle to be performed by warning a driver of the vehicle. For example, in a case where the vehicle appears to run out of a self-traveling region or a parking section region of a parking lot to other regions, the driving assistance apparatus can restrict drive force of the vehicle or apply braking force to the vehicle such that the vehicle is not deviated from the self-traveling region or the parking section region of the parking lot. Therefore, for example, the driving assistance apparatus can suppress an accident in a form in which the vehicle runs out of a self-traveling region or a parking section region of a parking lot to other regions.

In the driving assistance apparatus according to the first aspect, in a case where a frequency of execution of driving assistance for the vehicle based on the first control information is equal to or more than a predetermined threshold value, the controller may output second control information for restricting drive force for an operation on an accelerator pedal of the vehicle.

According to the first aspect, in a case where an operation frequency of driving assistance for suppressing the occurrence of an accident is high, the driving assistance apparatus can make it hard for the vehicle to be deviated from the traveling possible range by restricting drive force of the vehicle, for example, even when a wrong operation is performed on the accelerator pedal. Therefore, the driving assistance apparatus can more appropriately suppress the occurrence of an accident of the vehicle in a form not based on collision with an obstacle.

Other aspects of the present disclosure may be realized as a driving assistance system, a driving assistance method, and a program.

According to the aspects, it is possible to provide a driving assistance apparatus and the like capable of more appropriately suppressing the occurrence of an accident of a vehicle in a form not based on collision with an obstacle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, with reference to the drawings, an embodiment of the present disclosure will be described.

Summary of Driving Assistance System

Figure 1:
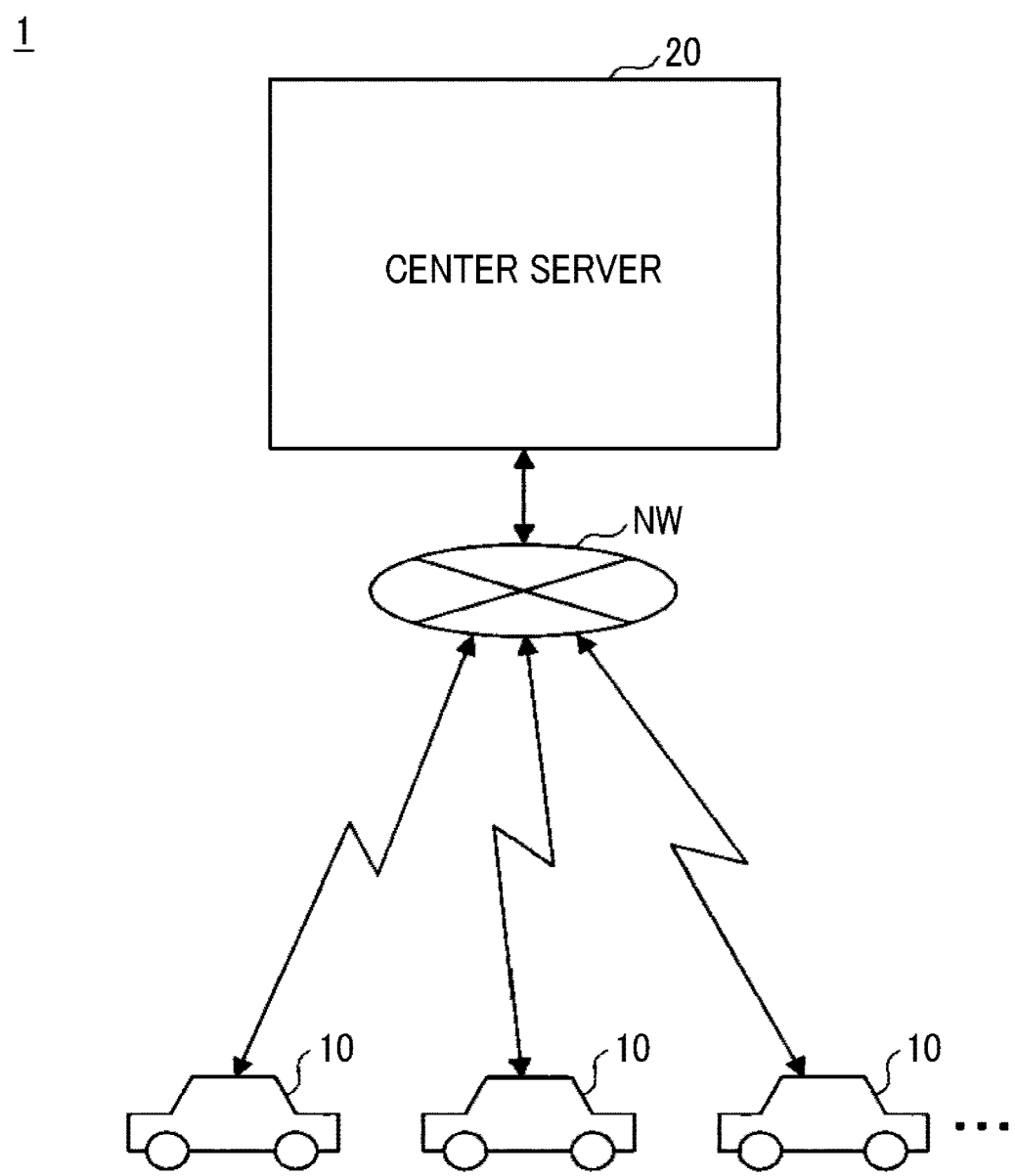
FIG. 1 is a schematic diagram illustrating an example of a configuration of a driving assistance system.

First, with reference to FIG. 1, a description will be made of a summary of a driving assistance system 1 according to the present embodiment.

The driving assistance system 1 includes a plurality of vehicles 10 and a center server 20.

In the driving assistance system 1, the center server 20 transmits control information to each vehicle 10 while the center server 20 monitors a movement state (traveling state) of each vehicle 10 or a state of a driver operating the vehicle 10, and thus performs driving assistance for the driver of the vehicle 10.

The vehicle 10 is communicably connected to the center server 20 via the communication network NW including, for example, a mobile communication network with a base station as an end, a satellite communication network using a communication satellite in the sky, and the Internet. The vehicle 10 uploads (transmits) dynamic information (hereinafter, referred to as "vehicle-related information") related to the predefined type of vehicle 10 to the center server 20 in response to a command from the center server 20 or automatically in accordance with a predefined timing. The vehicle-related information may include information (hereinafter, referred to as "vehicle state-related information") regarding various states of the vehicle 10, such as a position state of the vehicle 10, a movement state thereof, a state of a driver operating the vehicle 10, and a control state thereof. The vehicle-related information may include information (environmental state-related information) regarding a surrounding environmental state of the vehicle 10, such as a surrounding outside air temperature of the vehicle 10 measured by a temperature sensor or a surrounding raining state (for example, the presence or absence of rain drops or an amount thereof) of the vehicle 10 detected by a rain sensor.

The center server 20 (an example of a driving assistance apparatus) is communicably connected to each of the vehicles 10 via the network NW. The center server 20 receives the reservation information transmitted from each of the vehicles 10, monitors a movement state of the vehicle 10 or a state of a driver operating the vehicle 10 based on the reservation information, outputs control information regarding driving assistance for the driver of the vehicle 10, and transmits the control information to the vehicle 10. Details thereof will be described later.

Configuration of Driving Assistance System

Next, a description will be made of a configuration of the driving assistance system with reference to FIGS. 2A, 2B, and 3 in addition to FIG. 1.

Figure 2A:
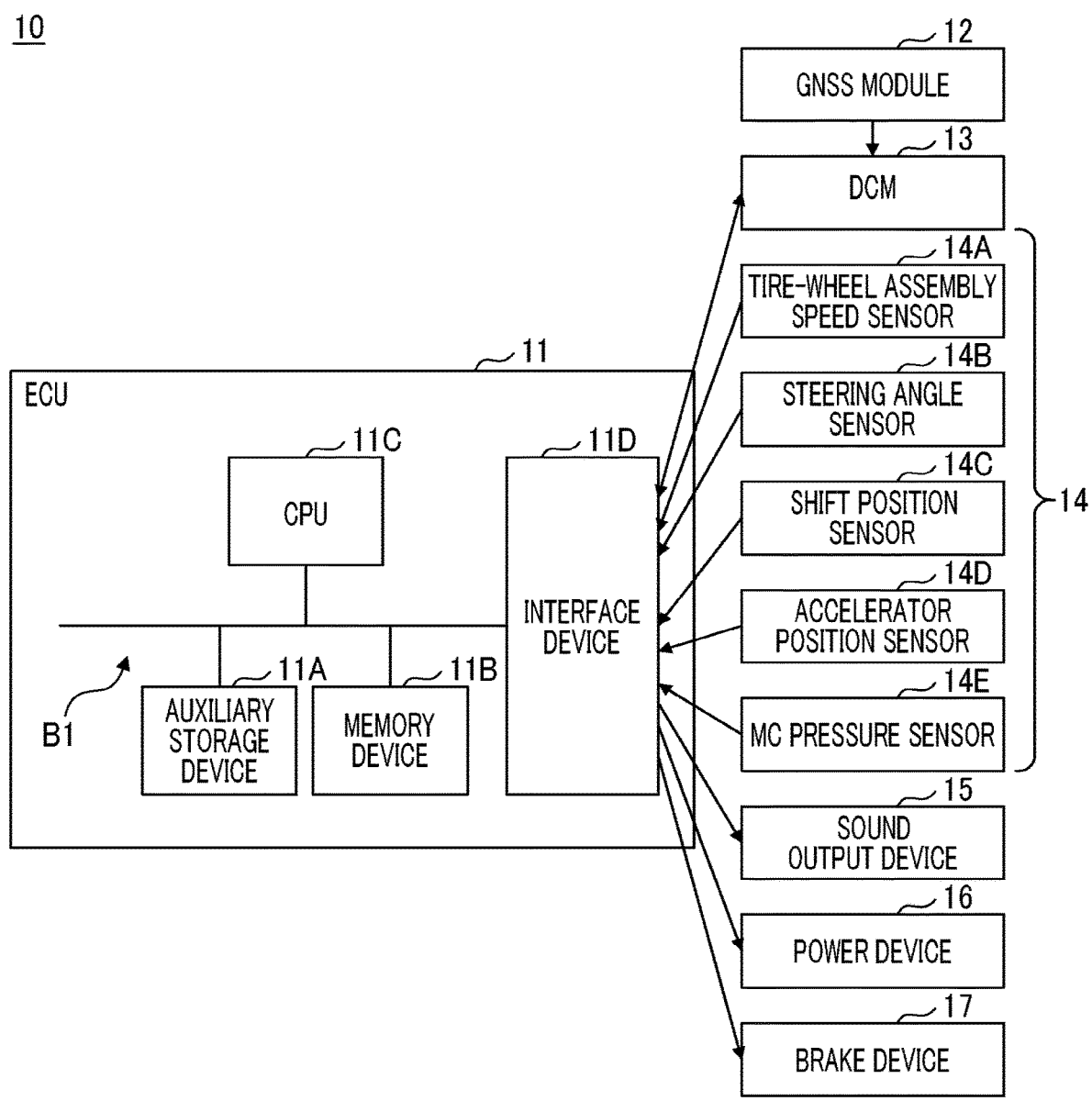
FIG. 2A is a diagram illustrating an example of a hardware configuration of a vehicle.
Figure 2B:
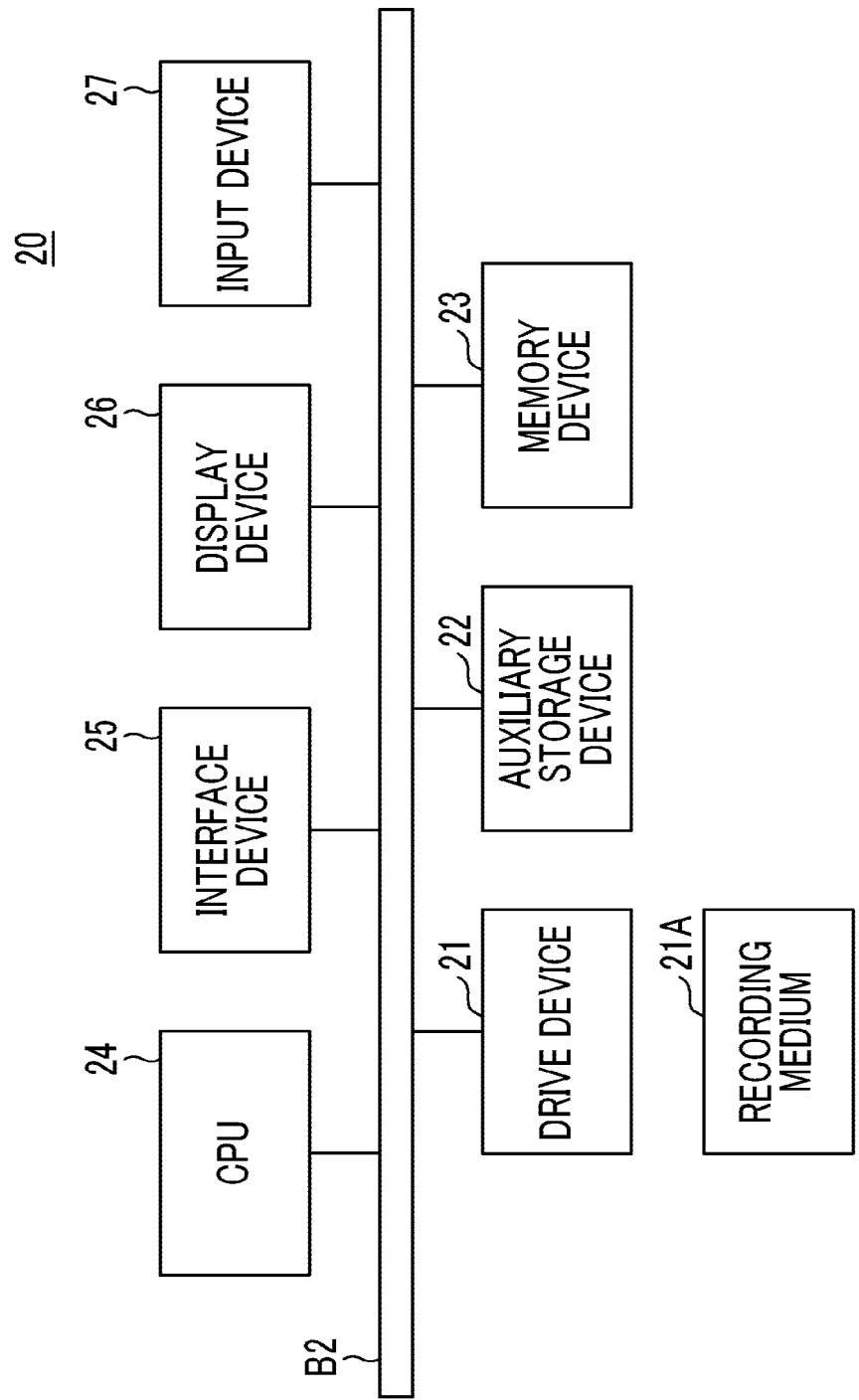
FIG. 2B is a diagram illustrating an example of a hardware configuration of a center server.

FIGS. 2A and 2B are diagrams illustrating an example of a hardware configuration of the driving assistance system 1. Specifically, FIG. 2A is a diagram illustrating an example of a hardware configuration of the vehicle 10, and FIG. 2B is a diagram illustrating an example of a hardware configuration of the center server 20. FIG. 3 is a diagram illustrating an example of a functional configuration of the driving assistance system 1.

Configuration of Vehicle

As illustrated in FIG. 2A, the vehicle 10 includes an electronic control unit (ECU) 11, a global navigation satellite system (GNSS) module 12, a data communication module (DCM) 13, on-vehicle sensors 14A-E, a sound output device 15, a power device 16, and a brake device 17.

The ECU 11 is an electronic control unit that performs control regarding various functions of the vehicle 10. The functions of the ECU 11 may be realized by any hardware or a combination of hardware and software. For example, the ECU 11 may be configured by using a microcomputer including an auxiliary storage device 11A, a memory device 11B, a central processing unit (CPU) 11C, and an interface device 11D that are connected to each other via a bus B1.

A program for realizing various functions of the ECU 11 is provided by a dedicated tool connected, via a cable, to a predetermined connector (for example, a data link coupler (DLC)) that is connected to an on-vehicle network such as a controller area network (CAN) of the vehicle 10. The program is installed into the auxiliary storage device 11A of the ECU 11 from the dedicated tool via the cable, the connector, and the on-vehicle network, in response to a predetermined operation in the dedicated tool. The program may be downloaded from another computer (for example, the center server 20) via the communication network NW, and may be installed into the auxiliary storage device 11A.

The auxiliary storage device 11A is nonvolatile storage means, stores the installed program, and also stores a needed file or data. The auxiliary storage device 11A is, for example, a hard disk drive (HDD) or a flash memory.

The memory device 11B reads the program from the auxiliary storage device 11A, and stores the program thereinto, in a case where there is an instruction for starting the program.

The CPU 11C executes the program stored in the memory device 11B, and realizes various functions of the ECU 11 according to the program.

The interface device 11D is used as an interface connected to, for example, the on-vehicle network or to various sensors and actuators on a one-to-one basis. The interface device 11D may include a plurality of different types of interface devices in accordance with connected targets.

The GNSS module 12 measures a position of the vehicle 10 (host vehicle) mounted with the GNSS module 12 by receiving satellite signals transmitted from three or more, preferably, four or more satellites in the sky over the vehicle 10. Information regarding a position measured by the GNSS module 12, that is, position information of the vehicle 10 is incorporated into the DCM 13 via, for example, a communication line on a one-to-one basis or the on-vehicle network. The information regarding a position measured by the GNSS module 12 may be incorporated into the ECU 11 via, for example, the on-vehicle network.

The DCM 13 is an example of a communication device that is connected to the communication network NW, and performs communication with external apparatuses including the center server 20 via the network NW. The DCM 13 performs transmission and reception of various signals (for example, an information signal and a control signal) with the center server 20. The DCM 13 is communicably connected to, for example, the ECU 11 via the on-vehicle network, and transmits various signals to the outside in response to a request from the ECU 11, or outputs signals received from the outside to the on-vehicle network toward the ECU 11.

The on-vehicle sensors 14A-E include a tire-wheel assembly speed sensor 14A, a steering angle sensor 14B, a shift position sensor 14C, an accelerator position sensor 14D, and a master cylinder (MC) pressure sensor 14E. Measured information in the on-vehicle sensors 14A-E is incorporated into the ECU 11 via a communication line on a one-to-one basis or the on-vehicle network such as a controller area network (CAN).

The tire-wheel assembly speed sensor 14A is known measurement means, provided at each of a plurality of (for example, four) tire-wheel assemblies of the vehicle 10, for measuring a rotational speed (hereinafter, referred to as a "tire-wheel assembly speed") of each tire-wheel assembly.

The steering angle sensor 14B is known measurement means for measuring a steering angle in a steering device of the vehicle 10.

The shift position sensor 14C is known measurement means for measuring a shift position in a transmission (transmission device) of the vehicle 10. For example, in a case of a manual transmission (MT), shift positions measured by the shift position sensor 14C may include shift positions respectively corresponding to a plurality of shift stages corresponding to forward movement of the vehicle 10, a shift position (reverse position) corresponding to a single shift stage corresponding to backward movement of the vehicle 10, and a neutral position. In a case of an automatic transmission (AT) or a dual clutch transmission (DCT), shift positions measured by the shift position sensor 14C may include a park position, a reverse position, a neutral position, a drive position, and positions respectively corresponding to a plurality of shift stages corresponding to forward movement of the vehicle 10.

The accelerator position sensor 14D is known measurement means for measuring a state of operating an accelerator pedal of the vehicle 10, for example, an operation amount or an operation speed.

The MC pressure sensor 14E is known measurement means for measuring a state of operating a brake pedal of the vehicle 10, for example, hydraulic pressure in a master cylinder generating brake pressure corresponding to an operation amount.

The sound output device 15 is provided in a vehicle cabin of the vehicle 10, and outputs predetermined sounds (for example, a buzzer sound or a beep sound) or predetermined voices. The sound output device 15 is, for example, a buzzer or a speaker.

The power device 16 is a power source driving the tire-wheel assemblies of the vehicle 10 via power transmission mechanisms such as the transmission (transmission device), a propeller shaft, and a differential (differential device). The power device 16 is, for example, an engine or an electric motor.

The brake device 17 is known braking means for generating braking force of the vehicle 10. The brake device 17 includes, for example, the master cylinder generating brake force corresponding to a state of a driver operating the brake pedal, a brake actuator that reduces, holds, or increases hydraulic pressure in the master cylinder, and a wheel cylinder applying the hydraulic pressure reduced, held, or increased by the brake actuator to each tire-wheel assembly.

Figure 3:
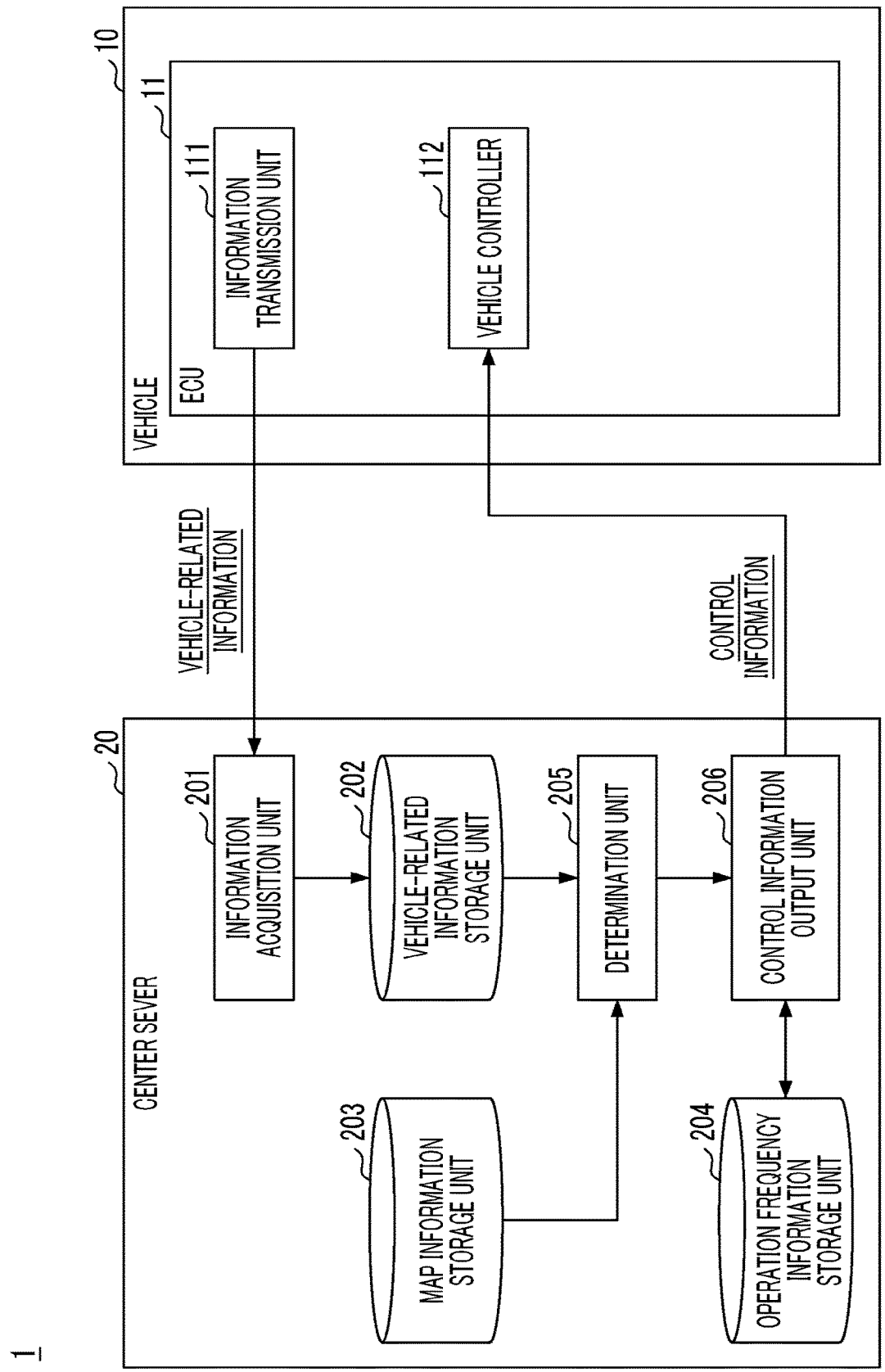
FIG. 3 is a diagram illustrating an example of a functional configuration of the driving assistance system.

As illustrated in FIG. 3, the ECU 11 includes an information transmission unit 111 and a vehicle controller 112 as functional units that are realized by executing one or more programs stored in the auxiliary storage device 11A on the CPU 11C.

The information transmission unit 111 acquires the dynamic vehicle information or causes the DCM 13 to acquire the vehicle-related information, for example, in a predetermined cycle (for example, every several tens of millimeter seconds or every several seconds), or transmits the vehicle-related information to the center server 20 via the DCM 13. Specifically, the information transmission unit 111 may transmit signals including identification information (for example, a vehicle index number (VIN) of the vehicle 10 or a vehicle identifier (ID) predefined for each of the vehicles 10) (hereinafter, referred to as "vehicle identification information") for the vehicle 10 as a transmission source, information (for example, a time stamp) (hereinafter, referred to as acquisition date-and-time information) regarding the acquisition date and time of the vehicle-related information, and the vehicle-related information, to the center server 20. Consequently, the center server 20 can identify (specify) the vehicle 10 as a transmission source of the signals including the vehicle-related information or specify the acquisition date and time (acquisition timing) of the vehicle-related information.

The function of the information transmission unit 111 may be transferred to the DCM 13.

The dynamic vehicle information transmitted by the information transmission unit 111 includes pieces of measured information in the on-vehicle sensors 14A-E such as the tire-wheel assembly speed sensor 14A, the steering angle sensor 14B, the shift position sensor 14C, the accelerator position sensor 14D, and the MC pressure sensor 14E. The transmission target vehicle-related information may include information (hereinafter, referred to as "vehicle speed information") regarding a vehicle speed of the vehicle 10, calculated based on the measured information in the tire-wheel assembly speed sensor 14A.

The vehicle controller 112 performs control regarding the vehicle 10 based on control information received from the center server 20. Details thereof will be described later.

Configuration of Center Server

The functions of the center server 20 may be realized by any hardware or a combination of hardware and software. As illustrated in FIG. 2B, for example, the center server 20 includes a drive device 21, an auxiliary storage device 22, a memory device 23, a CPU 24, an interface device 25, a display device 26, and an input device 27 which are connected to each other via a bus B2.

A program for realizing various functions of the center server 20 is provided by a portable recording medium 21A such as a compact disc read only memory (CD-ROM), a digital versatile disc read only memory (DVD-ROM), or a Universal Serial Bus (USB) memory. When the recording medium 21A recording the program is set in the drive device 21, the program is installed into the auxiliary storage device 22 from the recording medium 21A via the drive device 21. The program may be downloaded from another computer via a communication network, and may be installed into the auxiliary storage device 22.

The auxiliary storage device 22 stores the installed program, and also stores a needed file or data.

The memory device 23 reads the program from the auxiliary storage device 22, and stores the program thereinto, in a case where there is an instruction for starting the program.

The CPU 24 executes various programs stored in the memory device 23, and realizes various functions related to the center server 20 according to the programs.

The interface device 25 is used as an interface connected to a communication network (for example, the communication network NW).

The display device 26 displays, for example, a graphical user interface (GUI) according to a program executed by the CPU 24.

The input device 27 is used for a worker or a manager of the center server 20 to input various operation instructions regarding the center server 20.

As illustrated in FIG. 3, the center server 20 includes an information acquisition unit 201, a determination unit 205, and a control information output unit 206 as functional units that are realized by executing one or more programs stored in the auxiliary storage device 22 on the CPU 24. The center server 20 uses a vehicle-related information storage unit 202, a map information storage unit 203, and an operation frequency information storage unit 204. The vehicle-related information storage unit 202, the map information storage unit 203, and the operation frequency information storage unit 204 may be realized by using, for example, the auxiliary storage device 22, or an external storage device communicably connected to the center server 20.

The information acquisition unit 201 acquires the vehicle-related information received from each vehicle 10, and stores (accumulates) the vehicle-related information into the vehicle-related information storage unit 202. Specifically, the information acquisition unit 201 stores the vehicle-related information received from the vehicle 10 into the vehicle-related information storage unit 202 as a record associated with corresponding vehicle identification information and acquisition date-and-time information.

As described above, the vehicle-related information storage unit 202 stores the vehicle-related information received from the vehicle 10. Specifically, the vehicle-related information storage unit 202 may accumulate a record including the vehicle identification information, the acquisition date-and-time information, and the vehicle-related information, and may thus hold a record group (that is, a database) of the vehicle-related information acquired from the vehicles 10. Regarding the vehicle-related information storage unit 202, a dedicated dynamic vehicle information storage unit may be provided in each of the vehicles 10, and the history of a record including acquisition date-and-time information and vehicle-related information for each vehicle 10, that is, a record group may be held in the vehicle-related information storage unit.

The map information storage unit 203 stores map information in a region (hereinafter, referred to as a "monitoring target area") that is a monitoring target of the vehicle 10. The monitoring target area may be set to any region such as a region across a plurality of countries, an entire country, a single district across a plurality of prefectures or a plurality of provinces of one country, a single prefecture, a single province, a single city, a single town, and a single village. The map information includes information (hereinafter, referred to as "road information") regarding a road including a roadway region and a sidewalk region of the road, or a range or a boundary of a geographical position of a roadside zone region. The map information includes information (hereinafter, referred to as "facility information") regarding a facility including a region where the vehicle 10 can travel in a site of a predetermined facility, for example, a range of geographical positions of a self-traveling region and a parking section region where the vehicle 10 travels for itself and is thus movable in a self-traveling type parking lot including a multistory parking lot.

The operation frequency information storage unit 204 stores information (hereinafter, referred to as "operation frequency information") regarding of an operation frequency of control (accident avoidance control) for trying to avoid an accident, which will be described later. For example, the operation frequency information storage unit 204 stores operation frequency information for each of the vehicles 10. Specifically, the operation frequency information storage unit 204 stores a record for each of the vehicles 10, including vehicle identification information and an operation frequency corresponding to the vehicle 10. The operation frequency information storage unit 204 may store operation frequency information for each of users of the vehicles 10. This is because there is a plurality of users driving a single vehicle 10. In this case, among a plurality of users registered in advance, a user driving the vehicle 10 may be determined based on a captured image obtained by a camera in a vehicle cabin of the vehicle 10, or the user's input content on a GUI for selecting a driver, displayed on a display in the vehicle cabin when an accessory power source of the vehicle 10 is turned on. Information regarding a user during driving may be transmitted from the vehicle 10 to the center server 20 in a form of being included in vehicle-related information. Hereinafter turning-on and turning-off of the accessory power source will be respectively referred to as "ACC-ON" and time of "ACC-OFF".

The determination unit 205 determines whether or not, with respect to each of the vehicles 10, the target vehicle 10 may be deviated from a range (hereinafter, referred to as a "traveling possible range") in which the vehicle 10 can travel.

The traveling possible range includes, for example, a roadway region of a road, and, on the other hand, a traveling impossible range includes a sidewalk region or a roadside zone region of a road. In other words, the determination unit 205 may determine whether or not, with respect to the target vehicle 10 traveling on a road, the vehicle 10 may be deviated from a roadway region of the road to a sidewalk region or a roadside zone region.

The traveling possible range includes, for example, a self-traveling region and a parking section region of a parking lot including a multistory parking lot. In other words, the determination unit 205 may determine whether or not the vehicle 10 may be deviated from a self-traveling region and a parking section region of a self-traveling parking lot to others than the self-traveling region and the parking section region.

Specifically, the determination unit 205 determines whether or not the vehicle 10 may be deviated from the traveling possible range based on the map information in the map information storage unit 203, the current (actually, the latest) position information of the vehicle 10, and information regarding an advancing direction of the vehicle 10. In this case, the determination unit 205 may acquire position information of the vehicle 10 based on the latest vehicle-related information of the target vehicle 10, stored in the vehicle-related information storage unit 202. The information regarding an advancing direction of the target vehicle 10 is, for example, measured information in the steering angle sensor 14B and the shift position sensor 14C included in the latest vehicle-related information acquired from the vehicle 10, stored in the vehicle-related information storage unit 202. The information regarding an advancing direction of the target vehicle 10 may be, for example, a history of the latest position information of the vehicle 10 included in vehicle-related information of the vehicle 10, stored in the vehicle-related information storage unit 202. For example, in a case where an advancing direction of the vehicle 10 is directed toward a range other than the traveling possible range, and a condition (hereinafter, referred to as a "traveling possible range deviation condition") indicating that a distance between the current position of the vehicle 10 and a boundary of the traveling possible range when viewed in the advancing direction of the vehicle 10 is equal to or less than a predetermined distance is established, the determination unit 205 may determine that the vehicle 10 may be deviated from the traveling possible range. In this case, the predetermined distance may be varied depending on a vehicle speed such that the predetermined distance becomes longer as a vehicle speed of the vehicle 10 becomes higher. A vehicle speed of the vehicle 10 may be acquired based on measured information in the tire-wheel assembly speed sensor 14A included in vehicle-related information in the vehicle-related information storage unit 202, or vehicle speed information of the vehicle 10.

In a case where the determination unit 205 determines that the target vehicle 10 may be deviated to a range other than the traveling possible range, the control information output unit 206 transmits (outputs), to the vehicle 10, control information (hereinafter, referred to as "first control information") regarding accident avoidance control for trying to avoid an accident due to deviation to the range other than the traveling possible range. The control information is information for defining a control state regarding of the vehicle 10.

For example, the control information output unit 206 may output the first control information for requesting issuing of a warning to prompt a driver of the vehicle 10 to perform an operation for avoiding deviation of the vehicle 10 from the traveling possible range. In this case, the vehicle controller 112 of the vehicle 10 controls the sound output device 15 in response to the first control information received from the center server 20, and issues a warning to the driver of the vehicle 10 from the sound output device 15 in an audible manner. Instead of or in addition to the audible manner, the vehicle controller 112 of the vehicle 10 may issue a warning in a visual manner, for example, by displaying predetermined image information on a main display of a center cluster of an instrumental panel in the vehicle cabin of the vehicle 10 or a display in a meter. The vehicle controller 112 of the vehicle 10 may issue a warning in a tactile manner, for example, by vibrating a vibration device (vibrator) built into a driver's seat of the vehicle 10, instead of or in addition to at least one of the audible manner and the visible manner. Consequently, the center server 20 prompts a driver of the vehicle 10 to perform an operation for avoiding an accident due to deviation of the vehicle 10 from the traveling possible range, and thus it is possible to suppress the occurrence of an accident.

For example, the control information output unit 206 may output the first control information for requesting drive force from the power device 16 of the vehicle 10 to be restricted. For example, the content that the drive force output from the power device 16 is restricted to a predetermined upper limit value considerably lower than the maximum drive force may be defined in the first control information. In this case, the vehicle controller 112 of the vehicle 10 controls the power device 16 in response to the first control information received from the center server 20, and restricts the drive force from the power device 16. Thus, since the center server 20 restricts the drive force output from the power device 16 of the vehicle 10, and thus makes it hard for the vehicle 10 to advance, it is possible to give an additional time for a driver of the vehicle 10 to perform an operation for avoiding deviation from the traveling possible range, or to stop the vehicle 10 before being deviated from the traveling possible range. Therefore, the center server 20 can suppress the occurrence of an accident due to deviation from the traveling possible range. In this case, the vehicle controller 112 may be in an aspect of directly transmitting a control command to the power device 16 so as to control the power device 16, and may be in an aspect of indirectly controlling the power device 16 by transmitting a control request with a content corresponding to the first control information to another ECU controlling the power device 16. Hereinafter, this will also be the same for a case where the vehicle controller 112 controls the brake device 17.

For example, the control information output unit 206 may output the first control information for requesting the brake device 17 of the vehicle 10 to generate braking force. For example, the first control information may define therein a content that the brake device 17 generates the braking force in a preset braking mode in which the braking force is increased as a vehicle speed of the vehicle 10 becomes higher, and braking power is increased as a distance between the current position of the vehicle 10 and a boundary of the traveling possible range when viewed in an advancing direction of the vehicle 10 is reduced. In this case, the vehicle controller 112 of the vehicle 10 controls the brake device 17 (specifically, the brake actuator of the brake device 17) in response to the first control information received from the center server 20, and generates the braking force from the brake device 17 of the vehicle 10. Thus, since the center server 20 automatically applies the braking force to the vehicle 10, that is, decelerates the vehicle 10, it is possible to given an additional time for a driver of the vehicle 10 to perform an operation for avoiding deviation from the traveling possible range, or to stop the vehicle 10 before being deviated from the traveling possible range. Therefore, the center server 20 can suppress the occurrence of an accident due to deviation from the traveling possible range.

The control information output unit 206 may transmit the first control information for defining all of the warning to a driver, the restriction of drive force from the power device 16, and the generation of braking force in the brake device 17 as accident avoidance control to the vehicle 10, and may transmit the first control information for defining some thereof to the vehicle 10.

In a case where the first control information is output, the control information output unit 206 increments an operation frequency of accident avoidance control in the target vehicle 10, stored in the operation frequency information storage unit 204, by 1. In other words, the control information output unit 206 updates a record of operation frequency information corresponding to the target vehicle 10 by incrementing an operation frequency of accident avoidance control by 1.

In a case where, with respect to each of the vehicles 10, an operation frequency of accident avoidance control in the record of the operation frequency information of the vehicle 10 stored in the operation frequency information storage unit 204 is equal to or higher than a predetermined frequency (for example, five), the control information output unit 206 may transmit (output) control information (hereinafter, referred to as "second control information") for requesting a restriction of drive force from the power device 16 for an operation on the accelerator pedal to the vehicle 10 regardless of whether or not the vehicle 10 may be deviated from the traveling possible range. The second control information defines therein a content that the drive force output from the power device 16 is relatively small compared with a case where there is no restriction of the drive force with respect to an operation state (for example, an operation amount) of the accelerator pedal. In a case where there is a plurality of registered users for the target vehicle 10, with respect to each user, the control information output unit 206 may transmit, to the vehicle 10, the second control information in an aspect of being restricted to a case where the target user drivers the vehicle 10 in a case where an operation frequency of accident avoidance control of when the user drives the vehicle 10 is equal to or higher than a predetermined frequency. In this case, the vehicle controller 112 of the vehicle 10 controls the power device 16 in response to the second control information received from the center server 20, and restricts the drive force of the power device 16 that is output according to an operation amount of the accelerator pedal of the vehicle 10. Therefore, since the center server 20 restricts the drive force for an operation on the accelerator pedal of the vehicle 10, and thus gradually accelerates the vehicle 10, it is possible to suppress a repeated situation in which the vehicle 10 with a relatively high operation frequency of accident avoidance control is deviated from the traveling possible range.

In a case where a traveling possible range deviation condition for the target vehicle 10 is established, accident avoidance control is started, and then the traveling possible range deviation condition is not established, the control information output unit 206 may transmit control information (hereinafter, referred to as "third control information") for requesting cancellation of accident avoidance control to the vehicle 10. In this case, the vehicle controller 112 of the vehicle 10 cancels (finishes) the accident avoidance control in response to the third control information received from the center server 20.

In a case where a traveling possible range deviation condition for the target vehicle 10 is established, accident avoidance control is started, and then the vehicle 10 is automatically stopped due to a restriction of the drive force from the power device 16 or generation of the braking force in the brake device 17 regardless of an operation of a driver of the vehicle 10, the control information output unit 206 may transmit control information (hereinafter, referred to as "fourth control information") for requesting cancellation of accident avoidance control and transition of the vehicle 10 to a safe mode to the vehicle 10. The safe mode of the vehicle 10 is an operation mode of the vehicle 10 for evacuating the vehicle 10 to a safe location regardless of a driving operation of a driver of the vehicle 10. In this case, the vehicle controller 112 of the vehicle 10 cancels (finishes) the accident avoidance control and causes the vehicle 10 to transition to the safe mode in response to the fourth control information received from the center server 20. A control process in the vehicle 10 for realizing the safe mode may be performed by the ECU 11, and may be performed by other ECUs. In the safe mode, there may be an aspect in which the vehicle 10 does not accept an operation performed by a driver or the like, and is maintained in a stop state of the vehicle 10. In the safe mode, there may be an aspect in which the vehicle 10 autonomously moves to a safe location while recognizing peripheral situations of the vehicle 10 by using a camera, Light Detecting and Ranging (LIDAR), and millimeter-wave radar mounted on the vehicle 10, and is maintained in a stop state at the location. Consequently, for example, in a case where the vehicle 10 is automatically stopped since a driver of the vehicle 10 falls into a situation in which the driver cannot perform a driving operation due to sudden illness or falls into a situation in which the driver cannot perform an appropriate driving operation due to a panic, it is possible to avoid a situation in which the vehicle 10 starts to travel again due to an erroneous operation.

Specific Example of Process in Driving Assistance System

Next, with reference to FIGS. 4A and 4B, a process in the driving assistance system 1 will be described in detail.

Figure 4A:
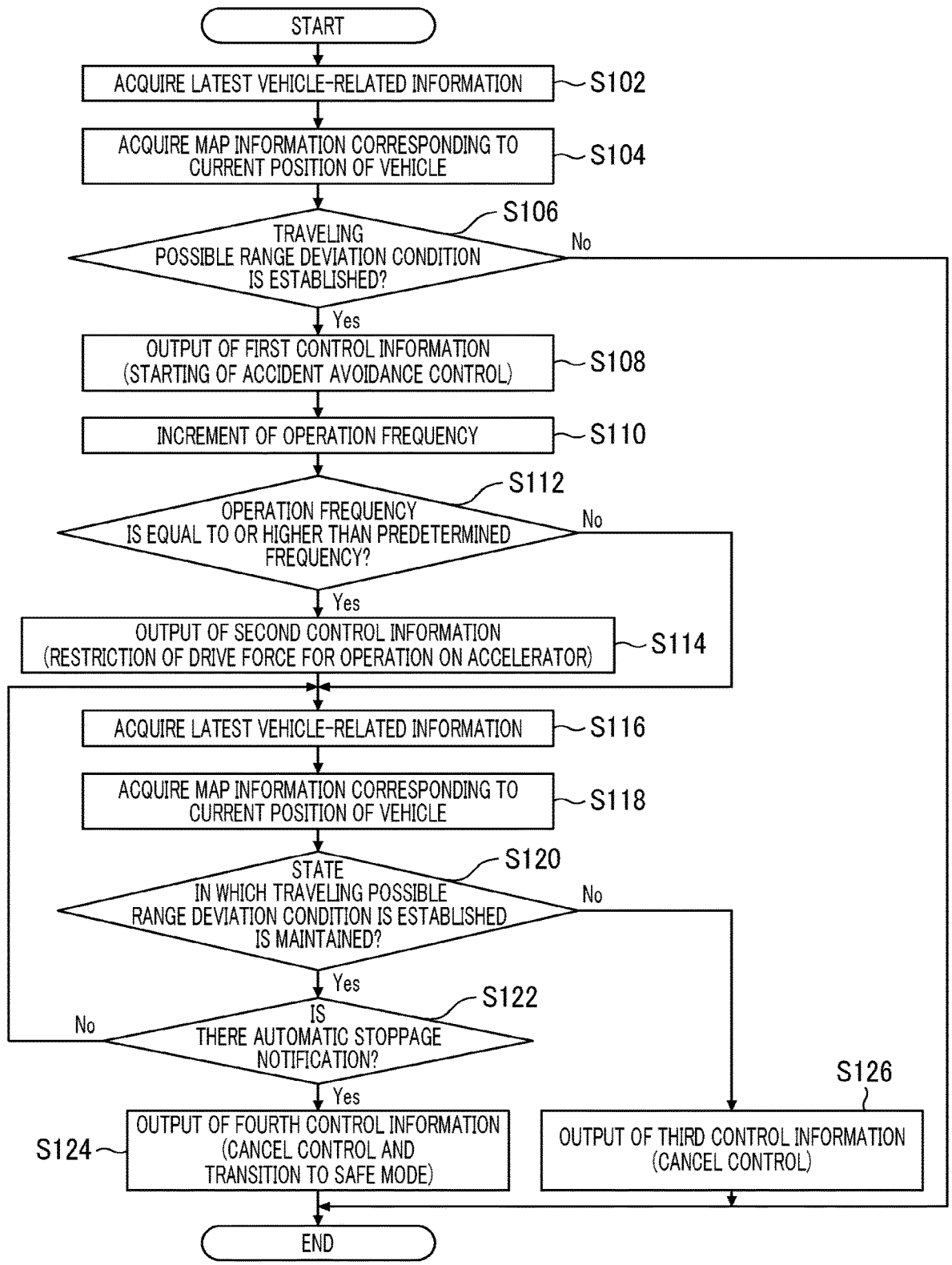
FIG. 4A is a flowchart schematically illustrating an example of a process performed by the center server.
Figure 4B:
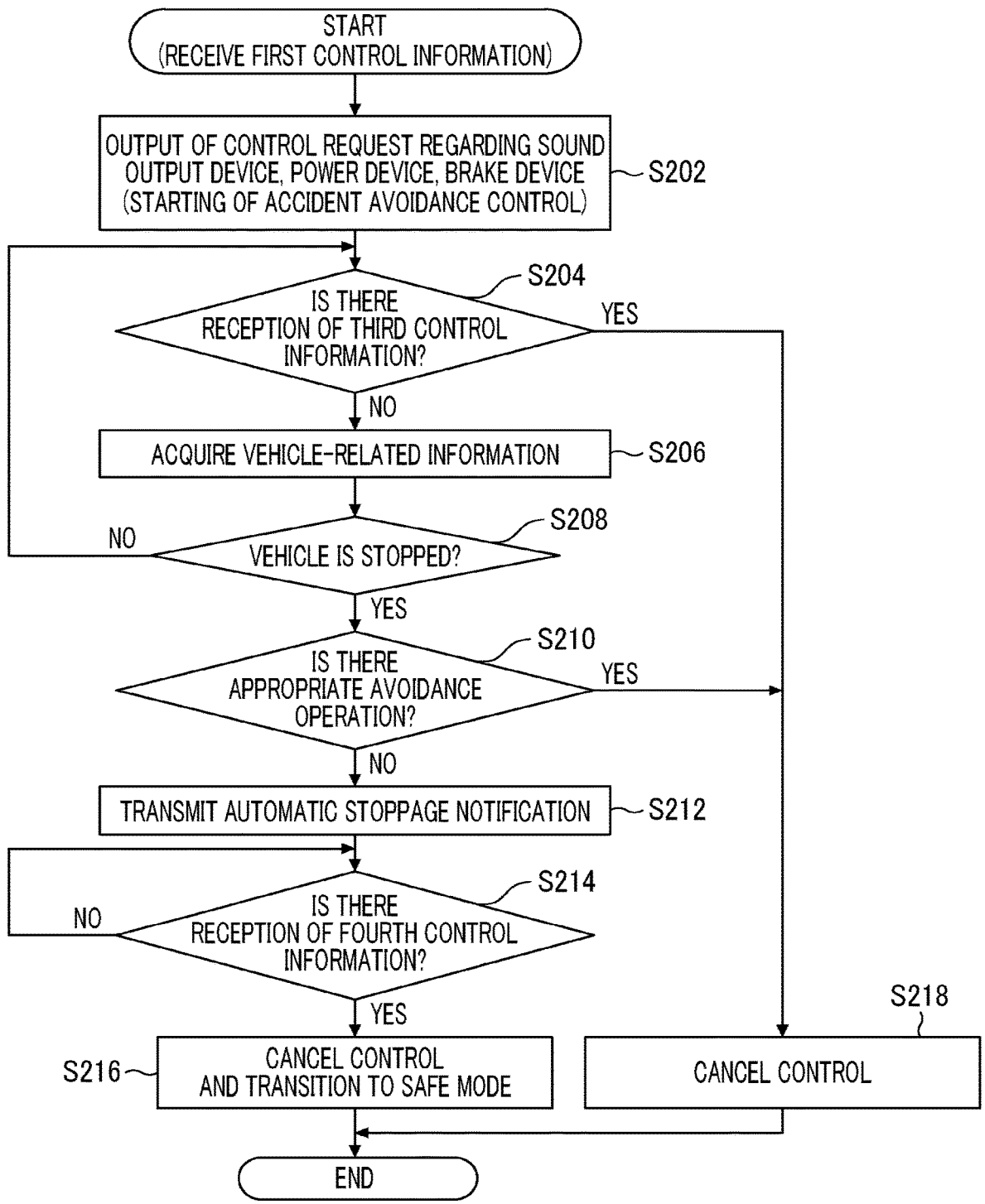
FIG. 4B is a flowchart schematically illustrating an example of a process performed by an ECU of the vehicle.

FIGS. 4A and 4B are flowcharts illustrating an example of a control process for suppressing deviation of the vehicle 10 from a traveling possible range in the driving assistance system 1. Specifically, FIG. 4A is a flowchart schematically illustrating an example of the control process in the center server 20. For example, a process in the present flowchart is repeatedly executed at a predetermined processing interval from activation (for example, ACC-ON) of the target vehicle 10 to stoppage thereof (for example, ACC-OFF) for each of the vehicles 10. FIG. 4B is a flowchart schematically illustrating an example of the control process in the vehicle 10. A process in the present flowchart is executed in a case where the first control information is received from the center server 20 from activation of the vehicle 10 to stoppage thereof.

First, as illustrated in FIG. 4A, in step S102, the determination unit 205 acquires the latest vehicle-related information of the target vehicle 10 from the vehicle-related information storage unit 202, and proceeds to step S104. Specifically, the determination unit 205 acquires position information (that is, position information corresponding to the current position) of the vehicle 10 and information regarding an advancing direction of the vehicle 10 in the vehicle-related information.

In step S104, the determination unit 205 acquires map information corresponding to the position information of the vehicle 10, that is, the current position of the vehicle 10 acquired in step S102 from the map information storage unit 203, and proceeds to step S106.

In step S106, the determination unit 205 determines whether or not a traveling possible range deviation condition is established. In a case where the traveling possible range deviation condition is established, the determination unit 205 determines that the vehicle 10 may be deviated from a traveling possible range, and proceeds to step S108. In a case where the traveling possible range deviation condition is not established, the determination unit 205 determines that there is no probability that the vehicle 10 may be deviated from the traveling possible range, and finishes the present process.

In step S108, the control information output unit 206 transmits the first control information to the vehicle 10, and proceeds to step S110.

In step S110, the control information output unit 206 increments an operation frequency of accident avoidance control in operation frequency information of the vehicle 10 stored in the operation frequency information storage unit 204 by 1, and proceeds to step S112.

In step S112, the control information output unit 206 determines whether or not the operation frequency of the accident avoidance control in the operation frequency information of the vehicle 10 stored in the operation frequency information storage unit 204 is equal to or higher than a predetermined frequency. The control information output unit 206 proceeds to step S114 in a case where the operation frequency of the accident avoidance control in the operation frequency information of the vehicle 10 is equal to or higher than a predetermined frequency, and proceeds to step S116 in other cases.

In step S114, the control information output unit 206 transmits the second control information to the vehicle 10, and proceeds to step S116.

In step S116, the determination unit 205 acquires the latest vehicle-related information of the target vehicle 10 from the vehicle-related information storage unit 202 in the same manner as in step S102, and proceeds to step S118.

In step S118, the determination unit 205 acquires map information corresponding to the position information of the vehicle 10 acquired in step S102 from the map information storage unit 203 in the same manner as in step S104, and proceeds to step S120.

In step S120, the determination unit 205 determines whether or not a state in which the traveling possible range deviation condition is established is maintained. The determination unit 205 proceeds to step S122 in a case where the traveling possible range deviation condition is still established, that is, the state in which the traveling possible range deviation condition is established is maintained, and proceeds to step S126 in other cases.

In step S122, the control information output unit 206 determines whether or not an automatic stoppage notification which will be described later, that is, a notification indicating that the vehicle 10 is automatically stopped without an appropriate operation of a driver of the vehicle 10 is received from the vehicle 10. The control information output unit 206 proceeds to step S124 in a case where the automatic stoppage notification is received from the vehicle 10, and returns to step S120 in other cases.

In step S124, the control information output unit 206 transmits the fourth control information to the vehicle 10, and finishes the present process.

On the other hand, in step S126, the control information output unit 206 transmits the third control information to the vehicle 10, and finishes the present process.

Even in a case where the traveling possible range deviation condition is not established through the determination process in step S120, the fourth control information may be transmitted to the vehicle 10 in the same manner as in step S120 in a case where it is determined that a driver of the vehicle 10 cannot perform an appropriate driving operation. For example, it may be determined whether or not a driving operation of the driver of the vehicle 10 before the traveling possible range deviation condition is not established from establishment of the traveling possible range deviation condition has such a content of preventing deviation of the vehicle 10 from the traveling possible range. In a case where it is determined that the driving operation of the driver of the vehicle 10 before the traveling possible range deviation condition is not established from establishment of the traveling possible range deviation condition does not have the content of preventing deviation of the vehicle 10 from the traveling possible range, the fourth control information may be transmitted to the vehicle 10. In this case, the determination is performed by using pieces of measured information in the tire-wheel assembly speed sensor 14A, the steering angle sensor 14B, the shift position sensor 14C, the accelerator position sensor 14D, and the MC pressure sensor 14E of the vehicle 10. The determination may be performed in the center server 20, and may be performed in the vehicle 10.

Next, as illustrated in FIG. 4B, in step S202, the vehicle controller 112 outputs control requests regarding the sound output device 15, the power device 16, and the brake device 17, so as to start accident avoidance control, and proceeds to step S204.

In step S204, the vehicle controller 112 determines whether or not the third control information has been received from the center server 20. The vehicle controller 112 proceeds to step S206 in a case where the third control information has not been received from the center server 20, and proceeds to step S218 in a case where the third control information has been received.

In step S206, the vehicle controller 112 acquires vehicle-related information, and proceeds to step S208. Specifically, the vehicle controller 112 acquires pieces of measured information in the on-vehicle sensors 14A-E such as the tire-wheel assembly speed sensor 14A, the steering angle sensor 14B, the shift position sensor 14C, the accelerator position sensor 14D, and the MC pressure sensor 14E.

In step S208, the vehicle controller 112 determines whether or not the vehicle 10 is stopped. The vehicle controller 112 proceeds to step S210 in a case where the vehicle 10 is stopped, and returns to step S204 in a case where the vehicle 10 is not stopped.

In step S210, the vehicle controller 112 determines whether or not there is an appropriate operation for avoiding deviation of the vehicle 10 from the traveling possible range from starting of the accident avoidance control to stoppage of the vehicle 10. In this case, the vehicle controller 112 may perform the determination by using a history of pieces of measured information in the tire-wheel assembly speed sensor 14A, the steering angle sensor 14B, the shift position sensor 14C, the accelerator position sensor 14D, and the MC pressure sensor 14E, corresponding to a content of a driving operation from starting of the accident avoidance control to stoppage of the vehicle 10. The vehicle controller 112 proceeds to step S212 in a case where there is no appropriate operation for avoiding deviation of the vehicle 10 from the traveling possible range, and proceeds to step S218 in a case where there is the appropriate operation for avoiding deviation of the vehicle 10 from the traveling possible range.

In step S212, the ECU 11 transmits an automatic stoppage notification to the center server 20, and proceeds to step S214.

In step S214, the vehicle controller 112 determines whether or not the fourth control information has been received from the center server 20. In a case where the fourth control information has not been received from the center server 20, the vehicle controller 112 waits for the fourth control information to be received (the process in this step is repeatedly performed), and proceeds to step S216 in a case where the fourth control information has been received from the center server 20.

In a case where the fourth control information cannot be received from the center server 20 for any reason such as a communication failure, the vehicle controller 112 may also proceed to step S216. This is performed to secure safety of the vehicle 10.

In step S216, the vehicle controller 112 cancels (finishes) the accident avoidance control, also causes the vehicle 10 to transition to a safe mode, and finishes the present process.

On the other hand, in step S218, the vehicle controller 112 cancels (finishes) the accident avoidance control, and finishes the present process.

The determination processes in step S208 and step S210 may be performed in the center server 20. In this case, in FIG. 4B, the processes in steps S206 to S212 are omitted, and, in FIG. 4A, processes corresponding to steps S206 to S212 are performed instead of step S122. In FIG. 4B, the determination processes in step S204 and step S214 are performed in series or in parallel, and, when one of the third control information and the fourth control information is received, the corresponding process in step S216 or step S218 is provided.

Operation of Present Embodiment

Next, a description will be made of an operation of the driving assistance system 1 (center server 20) according to the present embodiment.

In the present embodiment, the determination unit 205 determines whether or not the vehicle 10 may be deviated from a traveling possible range based on map information, position information of the vehicle 10, and information regarding an advancing direction of the vehicle 10. In a case where the determination unit 205 determines that the vehicle 10 may be deviated from the traveling possible range, the control information output unit 206 outputs the first control information regarding at least one of warning a driver of the vehicle 10, restricting drive force of the vehicle 10 regardless of an operation of the driver, and applying braking force to the vehicle 10 regardless of an operation of the driver.

Consequently, in a case where the vehicle 10 appears to be deviated from the traveling possible range such as a lane region of a road or a self-traveling region and a parking section region of a parking lot, the center server 20 can prompt an operation for avoiding deviation of the vehicle 10 to be performed by warning a driver of the vehicle 10. In a case where the vehicle 10 appears to be deviated from the traveling possible range such as a lane region of a road or a self-traveling region and a parking section region of a parking lot, the center server 20 can restrict drive force of the vehicle 10 or apply braking force to the vehicle 10 such that the vehicle 10 is not deviated from the traveling possible range. Therefore, the center server 20 can more appropriately suppress the occurrence of an accident of the vehicle 10 in a form not based on collision with an obstacle.

In the present embodiment, the traveling possible range of the vehicle 10 includes a roadway region of a road. The determination unit 205 may determine whether or not the vehicle 10 may be deviated from a roadway region of a road to a sidewalk region or a roadside zone region, and, in a case where the determination unit 205 determines that the vehicle 10 may be deviated from the roadway region of the road to the sidewalk region or the roadside zone region, the control information output unit 206 may output the first control information.

Consequently, for example, in a case where the vehicle 10 appears to run onto a sidewalk region from a roadway region of a road or appears to advance to a roadside zone region and fall out of a road, the center server 20 can prompt an operation for avoiding deviation of the vehicle 10 to be performed by warning a driver of the vehicle 10. For example, in a case where the vehicle 10 appears to run onto a sidewalk region from a roadway region of a road or appears to advance to a roadside zone region and fall out of a road, the center server 20 can restrict drive force of the vehicle 10 or apply braking force to the vehicle 10 such that the vehicle 10 is not deviated from the road to the roadside zone region or the sidewalk region. Therefore, for example, the center server 20 can suppress an accident in a form in which the vehicle 10 runs onto a sidewalk region from a roadway region of a road or an accident in a form in which the vehicle 10 advances to a roadside zone region from a roadway region and falls out of a road.

In the present embodiment, the traveling possible range of the vehicle 10 includes a self-traveling region and a parking section region of a self-traveling parking lot. The determination unit 205 may determine whether or not the vehicle 10 may be deviated from a self-traveling region or a parking section region of a parking lot to regions other than the self-traveling region and the parking section region, and, in a case where the determination unit 205 determines that the vehicle 10 may be deviated from the self-traveling region or the parking section region to regions other than the self-traveling region and the parking section region, the control information output unit 206 may output control information.

Consequently, for example, in a case where the vehicle 10 appears to run out of a self-traveling region or a parking section region of a parking lot to other regions, the center server 20 can prompt an operation for avoiding deviation of the vehicle 10 to be performed by warning a driver of the vehicle 10. For example, in a case where the vehicle 10 appears to run out of a self-traveling region or a parking section region of a parking lot to other regions, the center server 20 can restrict drive force of the vehicle 10 or apply braking force to the vehicle 10 such that the vehicle 10 is not deviated from the self-traveling region or the parking section region of the parking lot. Therefore, for example, the center server 20 can suppress an accident in a form in which the vehicle 10 runs out of a self-traveling region or a parking section region of a parking lot to other regions.

In the present embodiment, in a case where a frequency of execution of driving assistance for the vehicle 10 based on the first control information is equal to or more than a predetermined threshold value (predetermined frequency), the control information output unit 206 may output the second control information for restricting drive force for an operation on the accelerator pedal of the vehicle 10.

Consequently, in a case where an operation frequency of driving assistance for suppressing the occurrence of an accident is high in the vehicle 10, the center server 20 can make it hard for the vehicle 10 to be deviated from the traveling possible range by restricting drive force of the vehicle 10, for example, even when a wrong operation is performed on the accelerator pedal. Therefore, the center server 20 can more appropriately suppress the occurrence of an accident of the vehicle 10 in a form not based on collision with an obstacle.

As mentioned above, the embodiment of the present disclosure has been described in detail, but the present disclosure is not limited to the specific embodiment, and various modifications and alterations may occur within the scope of the spirit of the present disclosure disclosed in the claims.

For example, in the embodiment, the function of the control information output unit 206 of the center server 20 may be transferred to each vehicle 10 (for example, the ECU 11). In this case, in a case where the determination unit 205 determines that the vehicle 10 may be deviated from a traveling possible range, the center server 20 (an example of an information processing apparatus) transmits a notification signal indicating such a content to the vehicle 10. Consequently, the ECU 11 of the vehicle 10 can realize the function of the control information output unit 206 based on the notification information received from the center server 20.

In the modification example, the function of the determination unit 205 of the center server 20 may be transferred to each vehicle 10 (for example, the ECU 11 (an example of a driving assistance apparatus)). In other words, the ECU 11 of each vehicle 10 may determine whether or not the vehicle 10 (host vehicle) may be deviated from the traveling possible range based on vehicle-related information acquired in the host vehicle, and may control the host vehicle to warn a driver, restrict drive force from the power device 16, or automatically generate braking force in the brake device 17, in a case where the host vehicle may be deviated.

What is claimed is:

1. A driving assistance apparatus comprising:
 a processor configured to determine whether or not there is a probability that a vehicle is deviated from a traveling possible range based on map information, position information of the vehicle, and information regarding an advancing direction of the vehicle; and
 a controller configured to output first control information regarding at least one of warning a driver of the vehicle, restricting a drive force of the vehicle regardless of an operation of the driver, and applying a braking force to the vehicle regardless of an operation of the driver, in a case where the processor determines that there is the probability that the vehicle is deviated from the traveling possible range,
 wherein, in a case where a frequency of execution of driving assistance for the vehicle based on the first control information is equal to or more than a predetermined threshold value, the controller outputs second control information, different from the first control information, for restricting a drive force for an operation on an accelerator pedal of the vehicle.

2. The driving assistance apparatus according to claim 1, wherein:
 the traveling possible range includes a roadway region of a road;
 the processor is configured to determine whether or not there is a probability that the vehicle is deviated from the roadway region to a sidewalk region or a roadside zone region; and
 in a case where the processor determines that there is the probability that the vehicle is deviated from the roadway region of the road to the sidewalk region or the roadside zone region, the controller outputs the first control information.

3. The driving assistance apparatus according to claim 1, wherein:
 the traveling possible range includes a self-traveling region and a parking section region of a self-traveling parking lot;
 the processor is configured to determine whether or not there is a probability that the vehicle is deviated from the self-traveling region or the parking section region of the parking lot to regions other than the self-traveling region and the parking section region; and
 in a case where the processor determines that there is the probability that the vehicle is deviated from the self-traveling region or the parking section region to regions other than the self-traveling region and the parking section region, the controller outputs the first control information.

4. The driving assistance apparatus according to claim 1, further comprising a memory configured to store the frequency of execution of the driving assistance for each of a plurality of users of a plurality of vehicles.

5. A driving assistance system including a vehicle and an information processing apparatus performing communication with the vehicle, the driving assistance system comprising:
 a processor provided in the information processing apparatus and configured to determine whether or not there is a probability that the vehicle is deviated from a traveling possible range based on map information, position information of the vehicle, and information regarding an advancing direction of the vehicle; and
 a controller provided in the vehicle and configured to perform first control regarding at least one of warning a driver of the vehicle, restricting a drive force of the vehicle regardless of an operation of the driver, and a applying braking force to the vehicle regardless of an operation of the driver, in a case where the processor determines that there is the probability that the vehicle is deviated from the traveling possible range,
 wherein in a case where a frequency of execution of driving assistance for the vehicle based on the first control is equal to or more than a predetermined threshold value, the controller performs second control, different from the first control, for restricting a drive force for an operation on an accelerator pedal of the vehicle.

6. A driving assistance method executed by a driving assistance apparatus, the driving assistance method comprising:
 determining whether or not there is a probability that a vehicle is deviated from a traveling possible range based on map information, position information of the vehicle, and information regarding an advancing direction of the vehicle;
 outputting first control information regarding at least one of warning a driver of the vehicle, restricting a drive force of the vehicle regardless of an operation of the driver, and applying a braking force to the vehicle regardless of an operation of the driver, in a case where it is determined that there is the probability that the vehicle is deviated from the traveling possible range; and
 in a case where a frequency of execution of driving assistance for the vehicle based on the first control information is equal to or more than a predetermined threshold value, outputting second control information, different from the first control information, for restricting a drive force for an operation on an accelerator pedal of the vehicle.

7. A non-transitory storage medium storing a program causing a driving assistance apparatus to execute:
- determining whether or not there is a probability that a vehicle is deviated from a traveling possible range based on map information, position information of the vehicle, and information regarding an advancing direction of the vehicle,
- outputting first control information regarding at least one of warning a driver of the vehicle, restricting a drive force of the vehicle regardless of an operation of the driver, and applying a braking force to the vehicle regardless of an operation of the driver, in a case where it is determined that there is the probability that the vehicle is deviated from the traveling possible range, and
- in a case where a frequency of execution of driving assistance for the vehicle based on the first control information is equal to or more than a predetermined threshold value, outputting second control information, different from the first control information, for restricting a drive force for an operation on an accelerator pedal of the vehicle.

* * * * *